April 12, 1966 H. F. RIETH 3,246,215
CERAMIC CAPACITOR
Filed Sept. 27, 1963 2 Sheets-Sheet 1
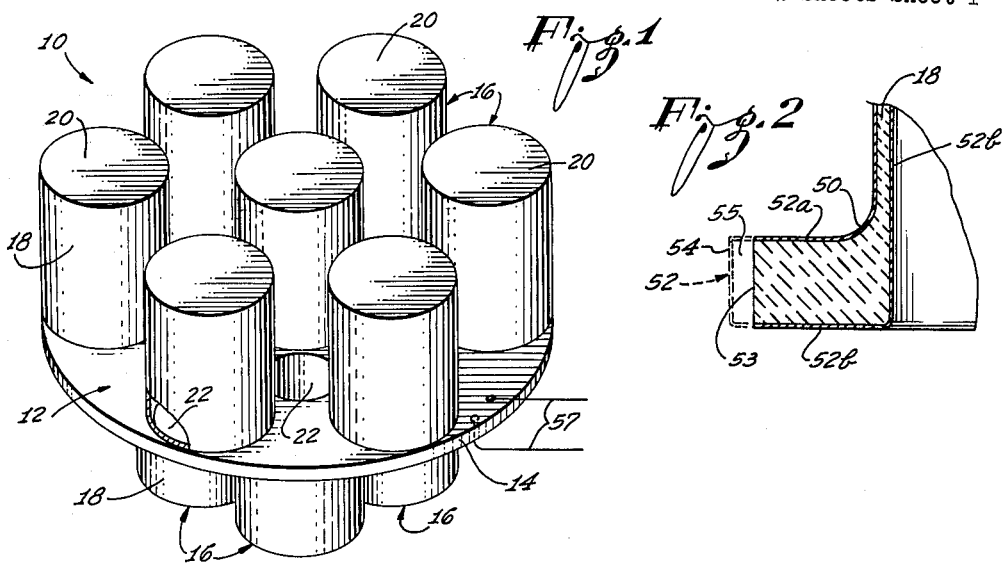
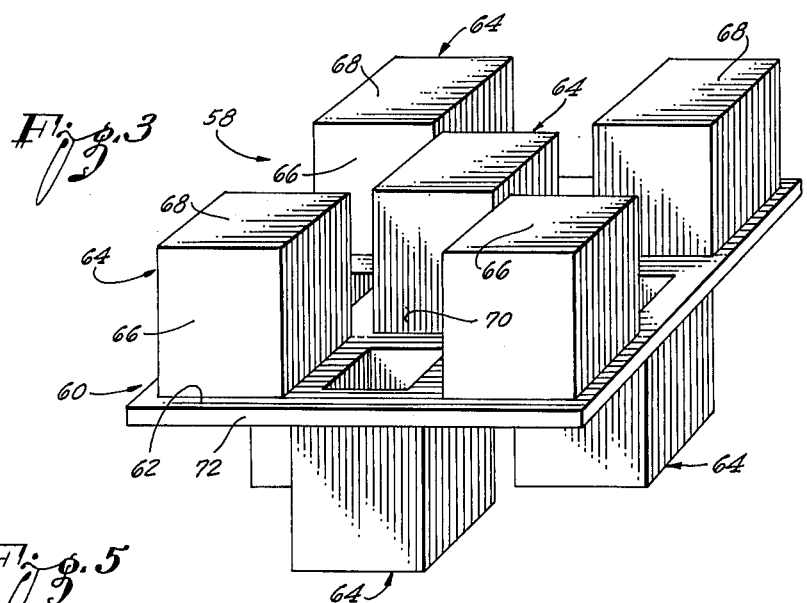
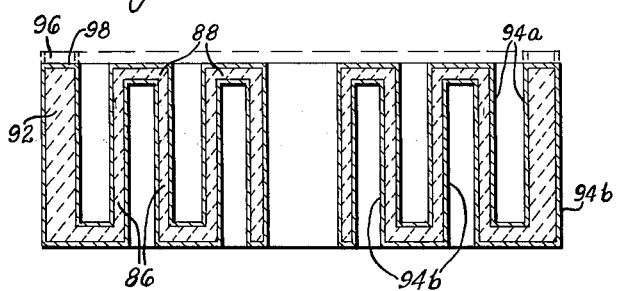
INVENTOR:
Harold F. Rieth
By Smyth, Roston & Pavitt
Attorneys April 12, 1966 H. F. RIETH 3,246,215
CERAMIC CAPACITOR
Filed Sept. 27, 1963 2 Sheets-Sheet 2
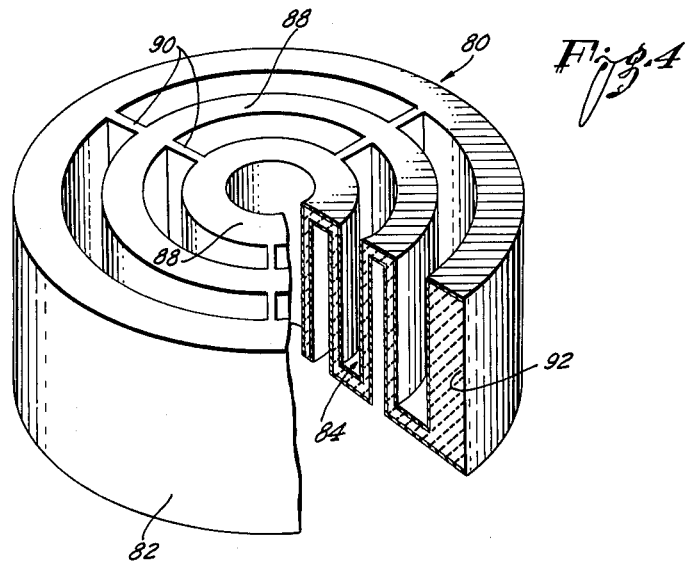
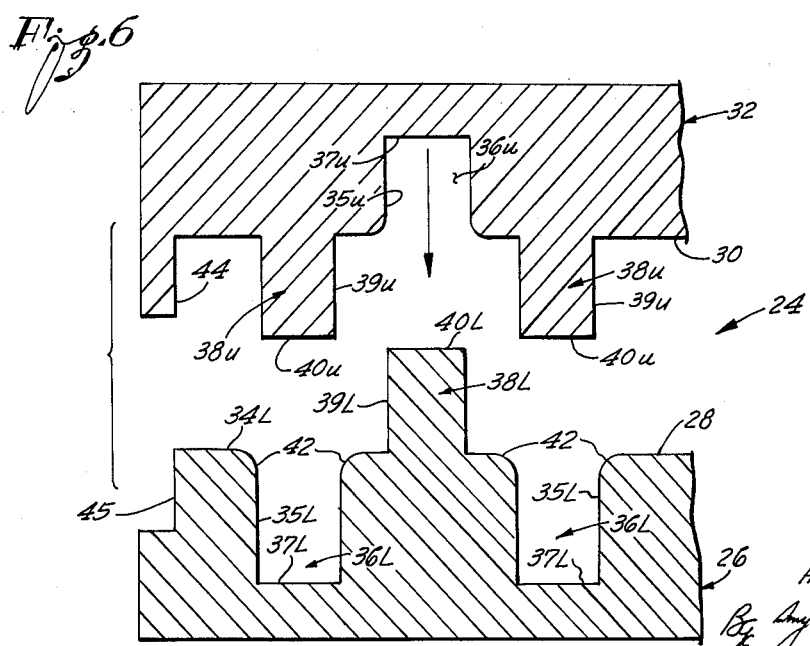
INVENTOR.
Harold F. Rieth
By Smyth, Roston & Pavitt
Attorneys

United States Patent Office 3,246,215
Patented Apr. 12, 1966

3,246,215
CERAMIC CAPACITOR
Harold F. Rieth, Santa Monica, Calif., assignor to Packard-Bell Electronics Corporation, Los Angeles, Calif., a corporation of California
Filed Sept. 27, 1963, Ser. No. 316,791
14 Claims. (Cl. 317—242)

The present invention relates to condensers for storing electrical energy, and more particularly to electrical condensers employing a thin layer of a dielectric material such as a ceramic material to separate a pair of conductive plates.

In most types of electronic equipment, it is necessary to provide a condenser which has a capacity for storing an electrical charge. Such a condenser normally has at least two electrically conductive plates separated from each other by means of a dielectric material. In the earlier forms, most of the condensers employed electrical plates consisting of a material such as a thin metallic foil and the dielectric spacer consisted of one or more strips of paper or similar material. The paper strips and foil were then wound into a cylinder to form a compact and easy to use condenser. Although such condensers are effective to produce the desired capacity, they are subject to several serious disadvantages such as being relatively large and subject to deterioration from moisture, etc.

Another form of condenser that has been developed is the so-called ceramic condenser. In a condenser of this variety, the dielectric comprises a ceramic material that is fused into a thin but rigid member. Conductive plates are then formed on the opposite sides of the ceramic member by a suitable process such as electroplating, silvering, vapor-blasting, etc. Although the ceramic condensers are a substantial improvement over the paper condensers, they still possess certain disadvantages. In order to obtain a high capacitance, it is necessary for the spacing between the conductive plates or the thickness of the ceramic member to be very thin and for the area of the conductive plates to be very large. Unfortunately, when the ceramic member is made very thin for a high capacitance, it becomes relatively weak and very delicate. This imposes practical limitations on how thin and how large the ceramic member can be made without breaking. This, in turn, limits the maximum capacitance that can be obtained from ceramic condensers. In addition, it has also been found extremely difficult, if not impossible, to maintain a very precise control over the thickness of the ceramic or dielectric material. The resultant variations in the thickness of the ceramic vary the spacing between the conductive plates. To compensate for this difficulty, it is necessary to measure the thickness of the ceramic. The conductive plates are then made the correct size to insure the resultant condenser having the desired overall capacitance.

It is now proposed to provide a ceramic condenser which will overcome the foregoing difficulties. More particularly, it is proposed to provide a ceramic condenser which may be made very small in size and may have a very high capacitance. Furthermore, the capacitance will be within very narrow limits and the condenser will be very strong and durable. This is to be accomplished by providing a novel condenser body containing a ceramic material and a method and apparatus for forming it. More particularly, the condenser body includes a ceramic base having a sufficient thickness to be very strong and rigid and a series of additional portions that are supported by the base and are free of any stresses or strains. As a consequence, the additional portions may be very thin and retain the conductive plates very close together to insure a high amount of capacitance.

These and other features and advantages of the present invention will become readily apparent from the following detailed description of one embodiment thereof, particularly when taken in connection with the accompanying drawings wherein like reference numerals refer to like parts, and wherein:

FIGURE 1 is a perspective view of a condenser embodying one form of the present invention;

FIGURE 2 is a fragmentary cross-sectional view, on a greatly enlarged scale, of a portion of the condenser of FIGURE 1;

FIGURE 3 is a perspective view of a condenser embodying another form of the present invention;

FIGURE 4 is a perspective view of a condenser embodying another form of the present invention, a portion of the condenser being broken away;

FIGURE 5 is a cross-sectional view taken through the center of the condenser of FIGURE 4; and FIGURE 6 is a transverse cross-sectional view of a mold suitable for producing condensers such as disclosed in the present invention.

Referring to the drawings in more detail, and particularly to FIGURES 1 and 2 thereof, the present invention is especially adapted to be embodied in an electrical condenser 10 wherein a pair of electrically conductive plates are separated from each other by means of a dielectric so that electrical charges may be stored on the two plates.

In the present embodiment, the condenser 10 includes a rigid body 12 fabricated from a suitable dielectric material. Although any suitable type of dielectric may be employed, by way of example, it may be a so-called ceramic material. Normally, the ceramic material is obtained as a finely divided and freely flowing powder. The powdered ceramic material may be placed in a mold of the desired configuration to form a so-called "green" ceramic structure. This green structure may be heated to a sufficient temperature to cause the particular grains in the powder to fuse into a single rigid structure. The resultant structure will be a vitreous member having a high dielectric constant.

The condenser body 12 may have a base 14 that is positioned to form a load supporting member. That is, the base 14 will act as a structural member that will form the backbone of the condenser. Accordingly, the base 14 should be of sufficient thickness to permit easy handling of the condenser 10 without damage. Also, the base 14 is of adequate strength to withstand the normal amount of vibration and acceleration, etc., encountered in a typical electronic installation. By way of example, it has been found that this base 14 in a finished condenser may have a thickness on the order of about 0.025 inch. However, this thickness has little, if any, effect on the capacity of the condenser 10 and, as a consequence, the base 14 may be of any desired size and shape to provide the desired strength, etc.

At the time that the base 14 is being formed, a series of projections 16 may also be formed. All of the projections 16 in a condenser may be substantially identical to each other or they may be different and they may extend from only one side of the base 14 or they may extend from both sides as shown in the present embodiment. In the present embodiment, each of the projections 16 are substantially cylindrical and include a cylindrical side wall 18 and a plane end wall 20.

The cylindrical wall 18 is disposed at substantially right angles to the plane of the base 14 while the end wall 20 is substantially parallel to the base 14. Although the size of the projections 16 may vary over an extended range, as will become apparent, it is desirable for the projections 16 to be relatively small. By making the projections relatively small, their strength may be made relatively large. By way of example, each of the projections 16 may have a diameter that is in a general range extending from about 1/16 inch to about 1/8 inch. At the same time, the height of each of the projections 16 may be in a range that extends from about 1/4 inch to about 3/8 inch. However, it should be expressly understood that the foregoing range of dimensions is for illustrative purposes only and under some circumstances it may be desirable for them to be of greater or smaller size. As will become apparent, it is very desirable that all of the projections 16 on the same side of the base 14 be of identical height so that their end walls 20 will be in a common plane.

The capacitance of a condenser is an inverse function of the thickness of the dielectric material separating the conductor plates. Accordingly, in order to obtain a high capacitance in the condenser 10, it is desirable for the dielectric material to be as thin as possible. Since the effective separation of the conductive plates in the condenser 10 will be determined primarily by the thickness of the walls 18 and 20, it is desirable they be made very thin. Although the wall thickness will be a function of a large number of factors such as the desired capacitance voltage ratings, etc., by way of example, the cylindrical side walls 18 may have a thickness on the order of about 0.005 inch. However, if desired, it has been found that these walls 18 may be made even thinner. For example, in the general region of about 0.002 inch or less. The end walls 20 may be of the same thickness as the side walls 18. However, for practical reasons it has been found that the end walls 20 may be advantageously made slightly thicker.

It should be noted that in order to obtain cylindrical walls 18 and end walls 20 having thicknesses in this region, the ceramic material should be very carefully pulverized or ground and sifted so that all of the particles in the original ceramic powder are substantially smaller than this thickness.

As previously stated, all of the projections 16 may be disposed on one side of the base 14. However, when the projections are all on one side, it is necessary to provide a clearance space between the cylindrical walls 18. This space must be large enough to permit the forming tools, etc., to be disposed around the cylindrical walls 18 during the forming and heating operations. It has been found that such a clearance space limits the number of projections that may be arranged on the base 14 and thereby produces a relatively low density of the projections 16. To overcome this difficulty, the projections 16 may be arranged on the opposite sides of the base 14, similar to the configuration illustrated in FIGURE 1.

The projections 16 on the opposite sides of the base 14 are staggered from each other. The opening 22 formed in the base 14 by the entrance into the interior of the projection 16 on one side of the base 14 will be aligned with the space between the exteriors of the projections 16 on the opposite sides of the base 14.

In order to conserve space, a small portion of each cylindrical wall 18 on one side of the base 14 may be substantially aligned with small portions of the cylindrical wall 18 on the opposite side of the base 14. The cylindrical walls 18 will thus be tangential to the openings 22 and will result in a very dense packing of the projections 16 upon the base 14. However, a sufficient clearance space will still be present between the projections 16 for the forming tools, etc.

To make a ceramic condenser body 12 of the nature shown in FIGURE 1, a molding apparatus 24, similar to that shown in FIGURE 6 may be employed. In the present instance, the molding apparatus 24 employs a lower mold member 26 having a forming surface 28 thereon, and an upper mold member 30 having a forming surface 32 thereon which is the complement of the first forming surface 28. The mold members 26 and 30 are adapted to intermesh with each other so that the space between the two forming surfaces 28 and 32 will define the opposite sides of the condenser body 12.

More particularly, the surface 28 on the lower mold member 26 includes a substantially plane portion 34 which extends across the face of the mold member. This portion 34 will be effective to define one side of the base 14

A series of recesses 36L may be provided within the face, so as to extend into the body of the mold 26 from the surface 28. Since the inside surfaces 35L of the recess 36L will define the exteriors of the side walls 18 in the projections 16, the inside diameter of the recesses 36L will correspond to the outside diameters of the projections 16. The inside surfaces 37L will define the outside surface of the end walls 20.

In addition, a series of projections 38L may be provided on the face so as to project from the body of the mold 26. These projections 38L are in substantial alignment with the spaces between the recesses 36L. The exterior surfaces 39L of the projections 38 will define the inside surfaces of the side walls 18 of the projections and will thus have outside diameters corresponding to the inside diameters of the side walls 18. The surface 40L will define the inside of the end wall 20.

The second or upper member 30 is a complement of the first or lower mold member 26. As a consequence, the upper member 30 includes a plurality of projections 38U which are aligned with the recesses 36L and a plurality of recesses 36U that are aligned with the projections 38L. The exteriors of the projections 38U include cylindrical surfaces 39U that will define the inside of the surface of the side walls 18 and plane end surfaces 40U that will define the inside of the end wall 20. The interiors of the recesses 36U include cylindrical surfaces 35U that define the exterior of the side walls 18 and plane surfaces 40U that define the exterior of the end walls 20. A pair of annular shoulders 44 and 45 may be provided around the edges of the mold members 30 and 26 to define the periphery of the base 12.

When the upper and lower members 26 and 30 are mated, the spacing between the exterior surfaces 39 of the projection 38 and the interior surface 35 of the recess 36 will be effective to define the thicknesses of the cylindrical walls 18. Accordingly, the diameters of the surfaces 35 and 39 should differ by an amount equal to the desired thickness of the walls 18. As previously stated, this thickness will normally be in a general range on the order of about 0.002 to 0.005 inch, although they may be more or less. The ceramic material should be sufficiently fine so that a single grain cannot completely or substantially completely fill the space between the surfaces 35 and 39 and simultaneously contact the surfaces on both molds. It should be noted that as long as the surfaces 35 and 39 are concentric, the space therebetween and therefore the thicknesses of the side walls 18 will be the same irrespective of the relative axial positions of the surfaces. However, if the projections 38 move relative to the recess 36, the space between the surfaces 37 and 40 will vary whereby the thickness of the end walls 20 will vary.

The spacing between the two parallel plane surfaces 28 and 32 will define the thickness of the base 14. As previously stated, this thickness may be on the order of 0.025 inch or such other thickness that produces the desired amount of strength and rigidity.

In order to produce or mold a body 12 for the condenser 10, a suitable dielectric or ceramic powder may be distributed over the surface of one or both of the mold members 26 and 30. Following this, two mold members 26 and 30 are brought together under a sufficient amount of force to compress the ceramic powder between the adjacent surfaces. This body is a so-called "green" ceramic member suitable for heating in a firing furnace to form a vitrious member.

Normally, the quantity or charge of ceramic material distributed between the mating surfaces of the molds is very carefully measured. However, in even the most carefully controlled operation, certain variations will occur between the successive charges of the ceramic material. Since the cylindrical side walls 18 in the projections 16 are very thin, an extremely small variation in the quantity of ceramic material in the walls will produce extremely large percentage changes in their thickness. As will be seen, such variations would produce correspondingly large variations in the capacity of the condenser 10.

However, as previously mentioned, as long as the projections 38 and the recesses are concentric, the side walls 18 will be assured wall thicknesses that are constant and very precisely controlled. Thus, any variations in the quantity in the amount of ceramic in the original will not affect the thickness of the walls 18. However, if there are variations in the charge, the distance between the two mold members 26 and 30 may be varied to vary the amount of spacing between the surfaces 28 and 30 and the surfaces 37 and 40 to accept the variations in the charge. In order to accommodate any variations in the relative positions of the mold members, the mechanism for forcing the mold members together may employ a spring, pneumatic, hydraulic, etc., drives. This will insure an adequate compressive force but will permit limited variations in the mold positions.

It is apparent that variations in the relative positions of the mold members 26 and 30 will result in very substantial variations in the thickness of the base 14 and of the end walls 20. However, since the thickness of the cylindrical walls 18 is the primary factor that determines the total capacity of the condenser 10, the thickness of the base 14 and end walls 20 will have very little, if any, effect upon the capacity. Compressed into a solid rigid structure, this "in the green" structure may be placed in a firing furnace and heated to a sufficient temperature to fuse the body into a vitrious mass. I should be noted that since the walls 18 of the projections 16 are very thin compared to the thickness of the base 14, after the firing the projections 16 will tend to contract at a much faster rate than the base 14 and also by a different amount. It has been found that this produces severe stress concentrations in the regions where the cylindrical walls 18 join the base 14. In order to prevent cracking and breaking of the projections 16, the entrances into the recesses 36 may include a convex surface 42. This will produce small fillets 50 at the bases of the projections 16. By experimentation, a contour for the surface 42 may be determined that will gradually blend the thicknesses of the base 14 and the side walls 18 together in a manner that will distribute the strain over a greater area and reduce the internal stress to a sufficiently low enough level to eliminate breakage.

After the ceramic material has been fused into a solid piece, the opposite sides of the condenser body 12 may be coated with a film or layer of an electrically conductive material. The coating 52 may consist of any suitable electrically conductive material that is easily applied to the ceramic body 12 and will adhere permanently to the body 12. For example, the coating 52 may be applied by an electro-plating process or by placing the body 12 in a cloud of a vaporized metal that will be deposited over the surface of the body 12. However, it has been found that by applying a powdered silver to the surfaces of the body 12 after it is vitrified, the body can be heated above the melting point of silver. This will cause the silver to flow into the interstices of the ceramic material. This will not only produce a very strong bond but will also bring the films on the opposite sides of the ceramic close together.

In most of the coating processes the conductive film 52 covers the entire surface on all sides of the body 12. As a result all portions of conductive coating will be electrically interconnected with each other. In order to separate the film 52 into two separate parts, the periphery 53 of the base 14 may be ground down to the ceramic material. This will be effective to remove a ring 54 of the film 52 and a portion 55 of the base 14 and electrically separate or divide the conductive coating 52 into two separate portions 52a and 52b. The portions 52a and 52b will thus be electrically independent conductive coatings. The two coatings 52a and 52b will be on the opposite sides of the body 12 and accordingly will be separated from each other by the thickness of the ceramic material. A pair of electrical leads 57 may be secured to the coatings 52a and 52b for interconnecting the condenser with other electrical components.

Since the cylindrical walls 18 and end walls 20 are very thin, the portions of the coatings on these walls will be very close together. As a consequence each of the projections 16 will have a substantial amount of capacitance in spite of their relatively small size. In the event it is desired to provide a large capacitance, the size of the projections 16 should not be increased beyond an amount that unduly weakens them. Instead the number of projections may be increased. By providing a large number of the projections 16, a condenser 10 can be provided which will have as large a capacity as desired. By providing the projections on the opposite side of the base 14, a large number of the projections may be packaged into a very small volume. It is of course apparent that as the number of projections 16 increases the size of the base 14 increases. Although the base 14 may be made of a sufficient thickness to insure the condenser 10 having an adequate strength to withstand the mechanical forces normally imposed thereon these are practical limitations that may limit the size of the condenser. If it is desired to provide a greater capacitance than can be obtained in a single condenser, it may be desirable to provide a plurality of condensers 10 connected in parallel to obtain the required capacity. In this event a plurality of substantially identical condensers 10 may be stacked together so that the projections 16 on one condenser 10 will extend into clearance spaces between the projections 16 on the other condenser 10. This will permit the condenser 10 to be packaged into a relatively small and compact volume with a very large capacity.

The capacity of the condenser 10 will be determined primarily by the thickness of the side walls 18. Since these walls are substantially parallel to the direction the mold members 28 and 30 move relative to each other their thickness will be very accurately controlled. This in turn will insure the condenser 10 having a very uniform capacity. Although there may be variations in the thicknesses of the base 12 and the end walls 20 they are so thick and/or of such a limited area they will not produce material variations in the capacity.

It should also be noted that although the projections 16 may consist of relatively thin and weak wall structures, they may be of relatively small diameter and short length, whereby each of the projections 16 will have a reasonable amount of strength. Moreover the base 14 may be positioned to act as a load supporting or bearing member that will carry the projections 16 without any material loads being applied thereto. This will be effective to prevent any damage or breakage of the condenser. All of the end walls 20 of the projections 16 on the same side of the condenser 10 may be disposed in a common plane. As a consequence, even though the condenser 10 may be supported by a surface that rests against the end walls 20, the forces will be distributed over a sufficiently large area to prevent damage to the condenser body 12.

As an alternative, the embodiment of FIGURE 3 may be employed. This embodiment also includes a body 60 that is a monolithic ceramic member and may be molded in a manner substantially identical to that prescribed in connection with the preceding embodiment. The present body 60 includes a base 62 that has a generally rectangular configuration. This base 62 is positioned to act as a load bearing or support member and may have a thickness that is adequate to insure a physically strong condenser.

A plurality of projections 64 may be provided on the base 60 so as to extend outwardly therefrom. Although the projections 64 may be on only one side of the base 62 in the present instance they extend from both sides. Each projection 64 includes a plurality of side walls 66 and an end wall 68. Each of the walls 66 and 68 may have a square or rectangular configuration. As a consequence, the projections 64 will have a substantially cubical shape.

The projections 64 on one side of the base 62 are aligned with the clearance spaces between the projections on the opposite side of the base 62. This configuration of the projections 64 will permit placing a large number of projections 64 on the base 62. At the same time the space clearance 70 between the projections 64 will be slightly greater in size than the size of the projections 64. As a consequence, the condenser bodies 60 may be stacked one on top of the other with each of the projections 64 on one condenser 58 fitting into the space 70 between the projections 64 on the adjacent condenser 58.

At the time the ceramic material is vitrified into a single rigid body or immediately thereafter, the body 60 may have both sides thereof coated with an electrically conductive material. This may be accomplished by a silvering, electro-plating, vapor deposition or any other suitable means. After the coating process the periphery 72 of the base 62 may be ground through the coating and into the ceramic material so as to divide the coating into two separate parts.

The various portions of the two conductive coatings are separated from each other by the thickness of the ceramic material therebetween. The side walls 66 forming the projections 64 may be very thin similar to the side walls 18. For example, the side walls 66 may be on the order of about 0.002 to 0.005 inches. However, if desired, they may be made even thinner or thicker. The end walls 68 correspond to the end walls 20. These end walls 68 are preferably relatively thin. However, the thickness should be adequate to permit a limited amount of variation resulting from the variations in the change of the ceramic material. As a result of the thinness of the walls 66 and 68, the projections 64 will have a substantial amount of capacity.

Although the thickness of the base 62 and the end walls may vary over a limited range the resultant effects on the overall capacity will be of a very minor nature. As a consequence, a small and compact condenser is provided that has a high capacity that will be within very narrow range.

As a further alternative, the embodiment 80 of FIGURES 4 and 5 may be employed. This embodiment 80 is similar to preceding embodiments, in that it also includes a body 82 that is a monolithic member molded from a dielectric such as a ceramic material. The body 82 may be molded by any suitable apparatus such as a mold similar to the mold structure 24 shown in FIGURE 6. The body 82 includes a series of convolutions 84 that are disposed concentrically about the axis of the body 82. All of the convolutions 84 which may be similar to each other include at least one side wall 86 and at least one end wall 88.

The side walls 86 may be substantially cylindrical and coaxial with each other and with the axis of the body 82. The end walls 88 are annular rings that are disposed coaxially with each other and in planes that are normal to the axis of the body 82. The end walls 88 may be molded as continuations of the side walls 86, so that the side walls 86 and the end walls 88 may be formed into a single structure that is continuous and unbroken.

To provide an adequate amount of strength, it may be desirable to provide one or more reinforcing ribs 90. The present ribs 90 are disposed between the adjacent side walls 86 and are positioned so as to extend radially outwardly from the center of the body 82. These ribs 90 will thus reinforce the various convolutions 84 and guard against breakage from mechanical forces applied thereto.

The outer cylindrical wall 92 may be made thicker than the side walls 86 in the convolutions 84. This wall 92 may thus function as a rim that will be a structural support for the remainder of the condenser body 82.

The condenser body may be molded by a suitable mold having a series of annular ribs positioned concentrically to mate with each other and define the surfaces of the walls. The mating surfaces of the ribs parallel to the axes of the molds and forming the walls 86 are preferably very close together. For example, these side walls 86 may be made on the same order of thickness as the side walls 18 and 66 in the first and second embodiments. Although the end walls 88 may also be very thin it may be desirable for the walls 88 to be thicker for structural reasons and/or to permit the mold members being positioned to accommodate variations in the amount of ceramic material in the original charge. Since the area of the walls 88 is relatively small variations in their thickness will have little if any effect on the overall capacity of the condenser.

At the time or after the ceramic body 82 is vitrified into a single rigid member, suitable electrically conductive surfaces 95 may be provided on the opposite sides of the body 82. This may be accomplished by any suitable process. Normally the conductive coating 94 will be applied to both sides so that with the electrically conductive material the entire body will be coated. In order to separate the coating into parts 94a and 94b, the edge 96 of the rim 92 may be ground so as to remove the conductive coating therefrom and make the end 98 of the rim substantially coplanar with the walls 88.

If it is desired to increase the capacity to an amount that is in excess of the amount that can conveniently be provided in a single condenser, a series of condensers may be stacked upon each other. This will cause at least a portion of the conductive surfaces on the various abutting end walls 88 to be electrically interconnected with each other. By properly interconnecting the remaining conductive coatings, to form a parallel circuit, a very compact condenser assembly can be made that will have any desired amount of electrical capacity.

While only a limited number of embodiments of the present invention are disclosed and described herein, it will be readily apparent to persons skilled in the art that numerous changes and modifications may be made without departing from the scope of the invention. For example, the ceramic body of the condenser may be molded so as to provide any type of configuration that is desired. Also, the dimensions and proportions recited with respect to the various embodiments are examples of practical condensers and may be varied if so desired. Accordingly, the foregoing disclosure and description thereof are for illustrative purposes only and do not in any way limit the invention which is defined only by the claims which follow.

What is claimed is:

1. An electrical condenser, including the combination of:
   a centrally disposed electrically nonconductive body of dielectric material,
   a first projection extending from said body in a first direction and including at least a first wall containing said dielectric material, said first wall being positioned to form a load bearing member and having a sufficient thickness to maintain said body in a predetermined fixed shape,
   a second projection extending from said body in a second direction opposite to the first direction and including at least a second wall formed integral with said body and containing said dielectric material, said last wall having a thickness substantially equal to that of the first wall, and
a layer of electrically conductvie material disposed on the exposed surfaces of the body and the first and second walls and provided with a gap in at least one position to define first and second plates of the condenser.

2. An electrical condenser defined by first and second plates, including the combination of:
an electrically nonconductive body of dielectric material,
a first portion of said body including a base containing said dielectric material, said base being positioned to form a load bearing wall and having a sufficient thickness to support said body and being defined by first and second oppositely disposed surfaces,
a second portion of said body being formed integrally with said first portion, said second portion including at least one projection that extends outwardly from said first portion in a direction transverse to the base and that has a side wall integral with the base and further has a top wall integral with the side wall, said side wall and said top wall being defined by first and second oppositely disposed surfaces, and
a layer of electrically conductive material disposed on the first and second oppositely disposed surfaces of said first and second portions of said body and having at least one separation to define the first and second plates of the condenser.

3. An electrical condenser defined by first and second plates, including the combination of:
an electrically nonconductive body of dielectric material,
a base forming a first portion of said body and containing said dielectric material and having a thickness that varies within a predetermined range and defining first and second oppositely disposed surfaces,
a plurality of projections forming a second portion of said body and extending from said base, each of said projections including at least one side wall containing said dielectric material and disposed in a direction transverse to the base and defined by a pair of oppositely disposed surfaces separated by the thickness of said wall, each of said projections further including a top wall extending from the side wall in a direction transverse to the side wall of the projection to provide an enclosure with the side wall, each of said top walls containing a dielectric material and being defined by a pair of oppositely disposed surfaces separated by the thickness of the top wall, and
a layer of electrically conductive material disposed on each of said surfaces of the base, the side walls and the top walls and having at least one gap to define the first and second plates of the condenser.

4. The electrical condenser set forth in claim 3, wherein the base is substantially planar and the side walls of the projections are substantially perpendicular to the base and the top walls of the projections are substantially parallel to the base.

5. An electrical condenser defined by first and second plates, including the combination of:
an electrical nonconductive body formed from a dielectric material,
a planar base forming a first portion of said body, said base having first and second oppositely disposed surfaces defining a thickness that varies within a particular range,
a plurality of first projections extending integrally from said base in a first direction and forming a second portion of said body, each of said first projections including at least a first wall containing said dielectric material and having first and second oppositely disposed surfaces separated from each other by the thickness of said wall, said surfaces being disposed in a direction transverse to said base, each of the first projections having a top wall extending integrally from the first wall in the projection and having first and second oppositely disposed surfaces,
a plurality of second projections extending integrally from said base in a second direction opposite to the first direction and forming a third portion of the body, each of said second projections including at least a first wall containing said dielectric material and having first and second oppositely disposed surfaces separated from each other by the thickness of said first wall, said surfaces being disposed in a direction transverse to said base, each of the second projections having a bottom wall extending integrally from the first wall in the projection and having first and second oppositely disposed surfaces, and
a layer of electrically conductive material disposed on first and second oppositely disposed surfaces of said base, the first and top walls of said first projections and the first and bottom walls of said second projections and having at least one gap to define the first and second plates of the condenser.

6. The electrical condenser set forth in claim 5 wherein the first projections are spaced on the base from the second projections.

7. The electrical condenser set forth in claim 6 wherein the base is substantially planar and wherein the first walls of the projections are substantially perpendicular to the base and wherein the top and bottom walls of the projections are parallel to the base.

8. An electrical condenser defined by first and second plates, including the combination of:
an electrically nonconductive base formed from a dielectric material and defined by first and second spaced surfaces,
at least one cylindrical projection extending integrally from said base, said projection including at least one cylindrical side wall disposed at substantially right angles to said body and including an end wall joining the side wall and disposed substantially parallel to the body, said cylindrical projection being formed from the dielectric material and being defined by first and second opposite surfaces, and
an electrically conductive film disposed on the first and second opposite surfaces of said body and said projection and having at least one gap to define the first and second plates of the condenser.

9. An electrical condenser defined by first and second plates, including the combination of:
an electrically nonconductive base formed from a dielectric material and defined by first and second spaced surfaces,
at least one polyhedral projection extending internally from said base, said projection including a plurality of planar walls transversely disposed with respect to said base and with respect to one another to define the polyhedron and further including at least one top wall extending integrally from the planar walls, said polyhedral projection being formed from the dielectric material and being defined by first and second opposite surfaces, and
an electrically conductive film disposed on the first and second opposite surfaces of said base and said polyhedral projection and having at least one gap to define the first and second plates of the condenser.

10. A condenser defined by first and second plates, including the combination of:
an electrically nonconductive body of dielectric material,
a substantially planar base forming a first portion of said body and containing said dielectric material, said base being positioned to form a load bearing member and having a sufficient thickness to support said body and being defined by first and second oppositely disposed surfaces, a plurality of projections integral with said base and extending outwardly from said base to form a second portion of said body, each of said projections having at least one side wall extending from the base and one top wall extending from the side wall, the side and top walls being positioned to define the outside dimensions of said projections, said side walls further being positioned to provide a clearance space between adjacent projections that is at least as large as the size of said projections, the side walls and the top walls of the projections being defined by first and second oppositely disposed surfaces, and a layer of electrically conductive material disposed on the first and second oppositely disposed surfaces of said base and the side and top walls of said projections and having at least one gap to define the first and second plates of the condenser.

11. The condenser set forth in claim 10, including, a plurality of second projections integral with the base and extending outwardly from the base to form a third portion of the body, the first projections extending in a first direction from the base and the second projections extending from the base in a second direction opposite to the first direction, each of the second projections having at least one side wall extending from the base and one bottom wall extending from the side wall, the side and bottom walls of the second projections being positioned to define the outside dimensions of the projections, the side walls of the second projections being staggered with respect to the side walls of the first projections and further being positioned to provide a clearance space between adjacent ones of the second projections that is at least as large as the second projections, the side walls and bottom walls of the second projections being defined by first and second oppositely disposed surfaces, the layer of electrically conductive material being disposed on the first and second oppositely disposed surfaces of the side and bottom walls of the second projections.

12. A condenser defined by first and second plates, including the combination of:

an electrically nonconductive body of dielectric material and defined by first and second opposite surat least one projection containing said dielectric material and defined by first and second opposite surfaces and extending from at least a first portion of said body, said projection including at least one side wall substantially perpendicular said body and at least one end wall disposed substantially parallel to said body, and an electrically conductive film on the opposite surfaces of the body and the projection and having a gap to form the first and second plates of the condenser.

13. An condenser defined by first and second plates, including the combination of:

an electrically nonconductive body of dielectric material, a substantially planar base forming a first portion of said base having a pair of surfaces on the opposite sides that are separated from each other by a sufficient thickness of dielectric material to provide a predetermined strength to said base.

a plurality of projections formed integral with said base and containing said dielectric material and extending outwardly from said surfaces on the opposite sides of said base to thereby form a second portion of said body, said projections being substantially identical to each other and having at least one side wall defined by opposite surfaces and positioned to define the outside dimensions of said projections, the thickness of said side walls being substantially less than the thickness of said base, and a layer of electrically conductive material disposed on the opposite surfaces of said base and said projections and having at least one gap to define the first and second plates of the condenser.

14. A condenser defined by first and second plates, including the combination of:

an electrically nonconductive body of dielectric material, a substantially planar base forming a first portion of said body and containing said dielectric material and defined by first and second opposite surfaces, said base being positioned to form a load bearing member and having a sufficient thickness to support said body, a plurality of projections integral with said base and containing said dielectric material and projecting from the opposite sides of said base to form a second portion of said body, said projections being substantially identical and including at least one side wall containing said dielectric material and having a thickness that is substantially less than the thickness of said base and that is defined by first and second surfaces, said side walls being positioned substantially parallel to a common axis that is normal to the plane of said base and being positioned to define the outside dimensions of said projections, said projections being separated from each other by a clearance space that is large enough to receive a corresponding projection on a complementary condenser nested against said first condenser, and a layer of electrically conductive material disposed on the first and second opposite surfaces of the base and the projections and having at least one gap to define the first and second plates of the condenser.

References Cited by the Examiner

UNITED STATES PATENTS

| 792,443 | 6/1905 | Morwitz | 317—242 |
| 1,797,878 | 3/1931 | Palm | 317—242 |
| 2,303,391 | 12/1942 | Rosenthal | 317—242 |
| 3,014,167 | 12/1961 | Winter | 317—260 |
| 3,017,696 | 1/1962 | Vaaler | 29—257 |
| 3,074,143 | 1/1963 | Smith | 29—257 |
| 3,090,895 | 4/1963 | Hall | 317—260 |

FOREIGN PATENTS

| 635,797 | 9/1936 | Germany. |
| 614,076 | 12/1948 | Great Britain. |

ROBERT K. SCHAEFER, *Primary Examiner.*

JOHN F. BURNS, *Examiner.*

E. GOLDBERG, *Assistant Examiner.*